United States Patent
Yang

(10) Patent No.: US 8,649,132 B2
(45) Date of Patent: Feb. 11, 2014

(54) TRIP DEVICE OF CIRCUIT BREAKER

(75) Inventor: Young Mo Yang, Cheongju-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 125 days.

(21) Appl. No.: 13/324,975

(22) Filed: Dec. 13, 2011

(65) Prior Publication Data

US 2012/0162844 A1 Jun. 28, 2012

(30) Foreign Application Priority Data

Dec. 23, 2010 (KR) .......................... 10-2010-0133123

(51) Int. Cl.
*H01H 73/00* (2006.01)
(52) U.S. Cl.
USPC ........................................... 361/42; 361/115
(58) Field of Classification Search
USPC .................................................. 361/42, 115
See application file for complete search history.

(56) References Cited

U.S. PATENT DOCUMENTS

| 4,425,596 A | * | 1/1984 | Satou | 361/93.6 |
| 4,901,184 A | * | 2/1990 | Ishii et al. | 361/86 |
| 6,842,322 B2 | * | 1/2005 | Houbre | 361/115 |

FOREIGN PATENT DOCUMENTS

| JP | 6-139914 | 5/1994 |
| JP | 6-77140 | 10/1994 |
| JP | 9-213196 | 8/1997 |

OTHER PUBLICATIONS

Japan Patent Office Application Serial Number 2011-281441, Office Action dated Mar. 26, 2013, 2 pages.

* cited by examiner

*Primary Examiner* — Danny Nguyen
(74) *Attorney, Agent, or Firm* — Lee, Hong, Degerman, Kang & Waimey

(57) ABSTRACT

Disclosed is a trip device of a circuit breaker, the device including: a rectifying unit converting an AC (Alternating Current) voltage applied to the circuit breaker to a DC (Direct Current) voltage; a smoothing unit connected to the rectifying unit in parallel to mitigate ripples of the converted DC voltage; and a trip coil connected to the smoothing unit in parallel to determine whether to trip the circuit breaker.

4 Claims, 2 Drawing Sheets

TRIP DEVICE OF CIRCUIT BREAKER

Pursuant to 35 U.S.C. §119 (a), this application claims the benefit of earlier filing date and right of priority to Korean Patent Application No. 10-2010-0133123, filed on Dec. 23, 2010, the contents of which is hereby incorporated by reference in their entirety.

BACKGROUND OF THE DISCLOSURE

1. Field

The teachings in accordance with the exemplary embodiments of this present disclosure generally relate to a trip device, and more particularly to a trip device for use in a circuit breaker.

2. Background

Generally, circuit breakers are used to protect electrical circuitry from damage due to an over-current condition, such as an overload condition or a relatively high level short circuit or fault condition by automatically interrupting the circuitry.

The circuit breaker may be largely categorized into three types, based on trip method, that is, a bimetal type which carries out a trip operation by being heated and bent in response to a persistent over-current condition, an electromagnetic field type which operates by sucking a core in response to an electromagnetic field formed on a coil when an over-current flows, and an electronic type which adopts an electronic trip device and a microprocessor.

The electronic trip device is advantageous in that it is not affected by ambient temperatures and little characteristic differences exist among products to provide a frequency characteristic that cannot be embodied by other types of trip devices, such that demands on electronic trip devices increase for important and high-end facilities Many circuit breakers also use auxiliary trip systems to perform auxiliary functions in addition to intrinsic function of circuit breaker. The auxiliary trip systems can be used in several ways, but are typically used to trip a breaker more rapidly than a primary trip device of the breaker. For example, the most frequently used auxiliary systems include an under-voltage trip device (UVT) and a remotely switchable trip auxiliary device (hereinafter referred to as remote trip device).

The UVT is an auxiliary trip system that detects under-voltage on a circuit if voltage lower than rated voltage is applied to the circuit, thereby automatically tripping the circuit breaker for protecting the circuit. That is, the UVT trips a circuit breaker when a load or a voltage on a line drops by 20%~70% below a reference voltage or when there occurs a blackout to prevent damage to the load or to the line from over-current during return to original voltage. The UVT includes therein a trip coil and electronic circuit.

The remote trip device is an auxiliary trip system capable of performing a remotely switchable trip function when a circuit breaker needs an emergent trip function due to abnormalcy on a load or on a line. The remote trip device includes therein a trip coil.

Now, a process of coupling an auxiliary trip system such as UVT or a remote trip device to an electromagnetic field type circuit breaker will be described with reference to FIG. 1.

FIG. 1 is a schematic view illustrating a coupled structure of an auxiliary device to a circuit breaker according to prior art.

In order to conventionally couple an auxiliary device (120) such as an UVT or a remote trip device to a circuit breaker, a user must open an auxiliary cover (110) rotatably mounted on a breaker cover (100) and personally mount the auxiliary device (120) to the circuit breaker.

To be more specific, when a user first unscrews a bolt (130) fastened to a side of the auxiliary cover (110) using a screw driver and rotates the auxiliary cover to one direction, the auxiliary cover (110) is opened as one side of the auxiliary cover (110) is hinged to the cover (100), as shown in FIG. 1.

At this time, a pair of fastening grooves (140) is formed respectively on right and left upper sides of the cover (100) to allow a standardized size of auxiliary device (120) to be inserted, where the user inserts and couples the auxiliary device to the grooves (140).

The conventional circuit breaker thus configured is disadvantageous in that both the UVT and the remote trip device as auxiliary devices must be equipped to detect an under-voltage on a circuit if a voltage lower than a rated voltage is applied to the circuit and to remotely trip a remote accident.

There is thus a need for a trip device that requires a fewer auxiliary trip systems, less energy and inconvenience for operation and that is less in cost.

SUMMARY

The present disclosure has been made to solve the foregoing disadvantages of the prior art and therefore an object of certain embodiments of the present disclosure is to provide a trip device of circuit breaker capable of performing both functions of an under-voltage trip device (UVT) and a remote trip device.

Technical subjects to be solved by the present disclosure are not restricted to the above-mentioned description, and any other technical problems not mentioned so far will be clearly appreciated from the following description by the skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

An object of the invention is to solve at least one or more of the above problems and/or disadvantages in whole or in part and to provide at least advantages described hereinafter. In order to achieve at least the above objects, in whole or in part, and in accordance with the purposes of the disclosure, as embodied and broadly described, and in one general aspect of the present invention, there is provided a trip device of a circuit breaker, the device comprising: a rectifying unit converting an AC (Alternating Current) voltage applied to the circuit breaker to a DC (Direct Current) voltage; a smoothing unit connected to the rectifying unit in parallel to mitigate ripples of the converted DC voltage; and a trip coil connected to the smoothing unit in parallel to determine whether to trip the circuit breaker.

Preferably, but not necessarily, the trip device further comprises a switching element connected to the trip coil in parallel to be turned on in response to an external control signal.

Preferably, but not necessarily, the external control signal is an interruption signal inputted through a user interface.

Preferably, but not necessarily, the trip coil trips the circuit breaker.

Preferably, but not necessarily, the trip coil trips the circuit breaker if an applied voltage is less than a reference voltage.

Preferably, but not necessarily, the rectifying unit includes bridge diodes.

Preferably, but not necessarily, the smoothing unit includes at least one or more parallel-connected capacitors.

Accordingly, different from the conventional technique requiring both an under-voltage trip device (UVT) and a remote trip device, the trip device of a circuit breaker according to the present disclosure can advantageously perform both the remotely switchable trip function and the under-voltage trip function by using one auxiliary device to dispense with separate purchase and/or installation of the under-voltage trip device (UVT) and the remote trip device, thereby simplifying a circuit structure, reducing a manufacturing cost, an installation space and a user inconvenience.

BRIEF DESCRIPTION OF THE DRAWINGS

The accompanying drawings, which are included to provide a further understanding of the disclosure and are incorporated in and constitute a part of this application, illustrate embodiment(s) of the disclosure, and together with the description serve to explain the principle of the disclosure. In the drawings.

DETAILED DESCRIPTION

Figure 1:
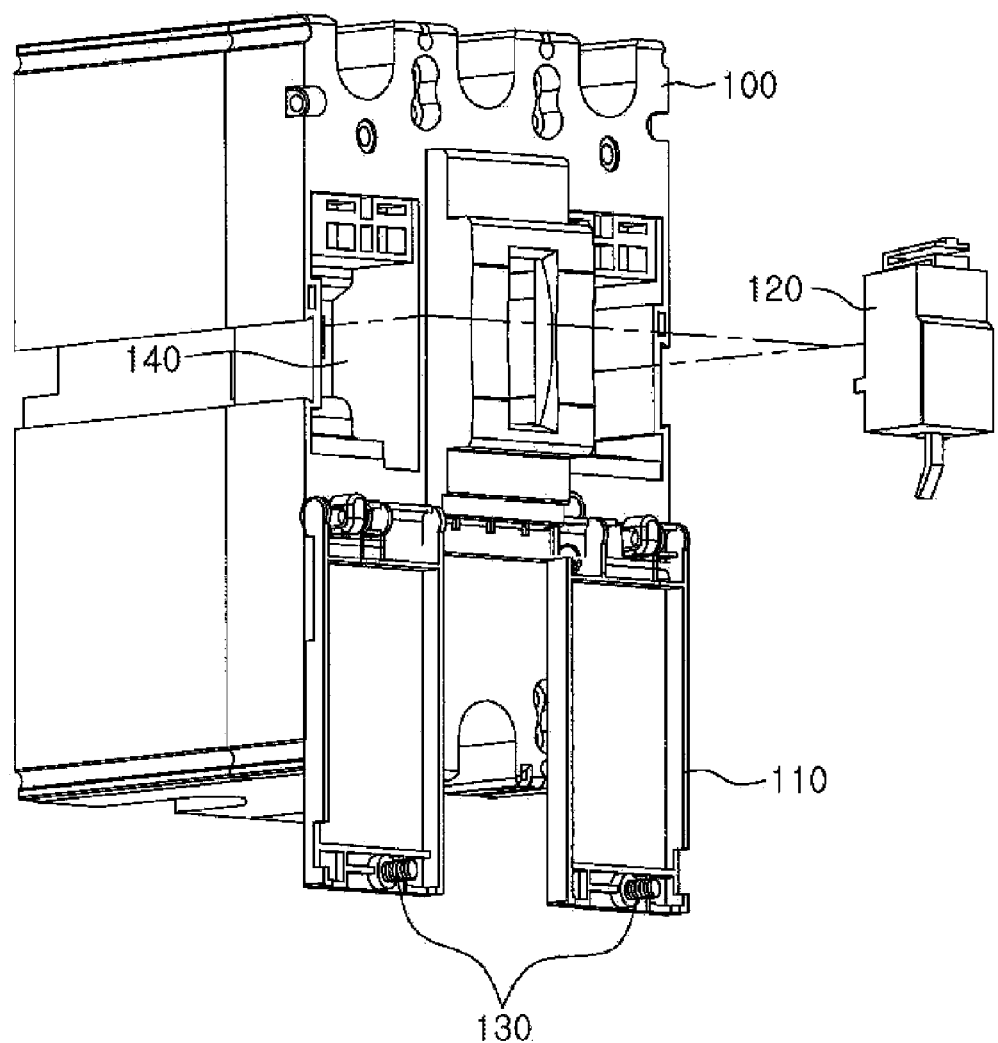
FIG. 1 is a schematic view illustrating a coupled structure of an auxiliary device in a circuit breaker according to prior art.

An exemplary embodiment will be described more fully hereinafter with reference to the accompanying drawings, in which the exemplary embodiment is shown. The present inventive concept may, however, be embodied in many different forms and should not be construed as limited to the exemplary embodiment set forth herein. Rather, this exemplary embodiment is provided so that this description will be thorough and complete, and will fully convey the scope of the present inventive concept to those skilled in the art. It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. As may be used herein, the terms "substantially" and "approximately" provide an industry-accepted tolerance for its corresponding term and/or relativity between items.

Descriptions of well-known components and processing techniques are omitted so as to not unnecessarily obscure the embodiments of the disclosure. In the drawings, the size and relative sizes of components and regions may be exaggerated for clarity.

Hereinafter, a trip device of a circuit breaker according to the present disclosure will be described in detail with reference to the accompanying drawing.

Figure 2:
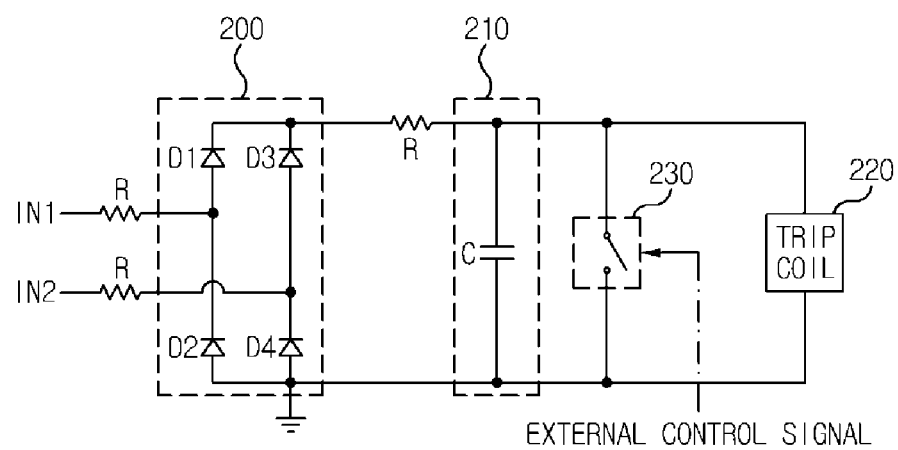
FIG. 2 is a schematic structural diagram illustrating a trip device of a circuit breaker according to an exemplary embodiment of the present disclosure.

FIG. 2 is a schematic structural diagram illustrating a trip device of a circuit breaker according to an exemplary embodiment of the present disclosure, where configuration of the trip device capable of performing both the remotely switchable trip function and the under-voltage trip function according to the present disclosure is shown.

Referring to FIG. 2, a trip device according to the present disclosure includes a rectifying unit (200), a smoothing unit (210), a trip coil (220) and a switching element (230).

The rectifying unit (200) converts an AC (Alternating Current) voltage applied to the circuit breaker to a DC (Direct Current) voltage and the smoothing unit (210) is connected to the rectifying unit (200) in parallel to mitigate ripples of the converted DC voltage. The rectifying unit (200) includes bridge diodes (D1, D2, D3 and D4) and the smoothing unit (210) includes at least one or more parallel-connected capacitors (C).

The trip coil (220) is connected to the smoothing unit (210) in parallel. The trip coil (220) receives the DC-converted voltage through the rectifying unit (200) and the smoothing unit (210) when the switching element (230) connected to the trip coil (220) in parallel is turned off Meanwhile, a current flowing to the trip coil (220) is interrupted if the switching element (230) is turned on because the current flows to the ground through the switching element (230).

The trip coil (220) trips the circuit breaker if the current is interrupted to make an applied voltage null or the voltage is less than a reference voltage.

Now, the trip device thus configured according to the exemplary embodiment of the present disclosure will be described in detail that operates both as an under-voltage trip device (UVT) and a remote trip device in a state of the switching element (230) being turned on and turned off.

First, an over-current over an established current may enter a sub load if a voltage on the main line goes down below a reference voltage, and in this case, if the over-current instantaneously enters the sub load, the sub load may be damaged, such that the under-voltage trip device (UVT) trips the circuit breaker during the voltage drop.

Thus, the trip device according to the present disclosure receives voltages (INT1 and INT2) of a main line in order to perform the under-voltage trip function. If the applied voltages are AC voltages, the AC voltages are converted to DC voltages through the rectifying unit (200) including the bridge diodes (D1, D2, D3 and D4) and the smoothing unit (210) including the capacitor (C).

If the switching element (230) is turned off, the DC voltage is applied to the trip coil (220), where the trip coil (220) trips the circuit breaker if the applied DC voltage is less than a reference voltage, determining that a current for maintaining the trip coil (220) is insufficient as the supplied current decreases. As a result, the trip device of a circuit breaker according to the present disclosure can prevent a load from being damaged due to insufficient voltage, because the insufficient voltage can be detected to allow tripping the circuit breaker.

Meanwhile, a remote trip device installed for remotely tripping a circuit breaker when necessary rapidly interrupts a line (load) if an accident occurs on the line. Thus, the switching element (230) turned on in response to an external control signal is connected to the trip coil (220) in parallel in the trip device of a circuit breaker according to an exemplary embodiment of the present disclosure, where the external control signal means an interrupting signal arbitrarily inputted by a user through a user interface (not shown) for swiftly interrupting a line when an accident is remotely generated on the line.

If the external control signal is inputted, the switching element (230) is turned on and a current flows to the ground through the switching element (230) to interrupt a current flowing to the trip coil (220). The trip coil (220) trips the circuit breaker by the current interruption, whereby the trip device according to the present disclosure can perform the function of tripping the circuit breaker on the accident happening in the remote place.

The previous description of the present disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

As apparent from the foregoing, the trip device of a circuit breaker according to the present disclosure has an industrial applicability in that it can advantageously perform both the remotely switchable trip function and the under-voltage trip function by using one auxiliary device to dispense with separate purchase and/or installation of the under-voltage trip device (UVT) and the remote trip device, thereby simplifying a circuit structure, reducing a manufacturing cost, an installation space and a user inconvenience.

What is claimed is:

1. A trip device of a circuit breaker, the device comprising:
   a rectifying unit including bridge diodes, converting an AC (Alternating Current) voltage applied to the circuit breaker to a DC (Direct Current) voltage;
   a smoothing unit including at least one or more parallel-connected capacitors, connected to the rectifying unit in parallel to mitigate ripples of the converted DC voltage;
   a trip coil connected to the smoothing unit in parallel to determine whether to trip the circuit breaker; and
   a switching element connected to the trip coil in parallel to be turned on in response to an external control signal.

2. The trip device of claim 1, wherein the external control signal is an interruption signal inputted through a user interface.

3. The trip device of claim 1, wherein the trip coil trips the circuit breaker.

4. The trip device of claim 1, wherein the trip coil trips the circuit breaker if an applied voltage is less than a reference voltage.

* * * * *